US007285755B1

(12) United States Patent
Kingdon et al.

(10) Patent No.: US 7,285,755 B1
(45) Date of Patent: Oct. 23, 2007

(54) APPARATUS AND METHOD FOR A CHAIN MOTIVATED TOASTER WITH VERTICALLY ALIGNED ROLLERS

(75) Inventors: Charles J. Kingdon, Flower Mound, TX (US); Gabriel Michael Beddingfield, Red Oak, TX (US)

(73) Assignee: American Permanent Ware Corporation, Dallas, TX (US)

( * ) Notice: Subject to any disclaimer, the term of this patent is extended or adjusted under 35 U.S.C. 154(b) by 621 days.

(21) Appl. No.: 10/912,956

(22) Filed: Aug. 6, 2004

Related U.S. Application Data

(63) Continuation-in-part of application No. 10/851,024, filed on May 21, 2004.

(51) Int. Cl.
*A47J 37/00* (2006.01)
*A47J 37/08* (2006.01)
*F27B 9/24* (2006.01)
*F27B 9/36* (2006.01)

(52) U.S. Cl. .................. 219/388; 219/470; 99/386
(58) Field of Classification Search ............. 219/470; 99/386
See application file for complete search history.

(56) References Cited

U.S. PATENT DOCUMENTS

| | | | |
|---|---|---|---|
| 1,691,361 A * | 11/1928 | Roberts ............. | 99/386 |
| 3,291,036 A | 12/1966 | Perl | |
| 3,400,651 A | 9/1968 | Hatch | |
| 3,520,249 A * | 7/1970 | Miller, Jr. ............. | 219/388 |
| 3,589,279 A | 6/1971 | Deutsch et al. | |
| 4,261,257 A | 4/1981 | Henderson et al. | |
| 4,488,480 A | 12/1984 | Miller et al. | |
| 4,530,276 A | 7/1985 | Miller | |
| 5,673,610 A | 10/1997 | Stuck | |
| 6,019,030 A * | 2/2000 | Kettman ............. | 99/386 |
| 6,177,654 B1 * | 1/2001 | Schackmuth ......... | 219/388 |
| 6,257,132 B1 | 7/2001 | Bifulco | |
| 6,624,396 B2 | 9/2003 | Witt et al. | |

* cited by examiner

*Primary Examiner*—Joseph Pelham
(74) *Attorney, Agent, or Firm*—Sanford E. Warren, Jr.; Akin Gump Strauss Hauer & Feld

(57) ABSTRACT

A vertically oriented roller oven have an oven housing forming an oven cavity, one or more food product inlet openings, an internal heating portion distinguishably separated by first and second series of centrally disposed vertically aligned and axially displaced rollers and an exit opening each in communication with the oven cavity. First and second backing plates are respectfully positioned opposite each of said first and second series of centrally disposed vertically aligned and axially displaced rollers to frictionally engage and capture a food product and causing the food product to descendingly traverse the internal portion of the oven cavity between the plurality of vertically aligned and axially displaced rollers and correspondingly positioned first and second backing plates. A conveying means is disclosed which includes a continuously linked chain motivated by an electric motor connected to a sprocket mountably affixed to a roller seating bracket and an engagement gear located on an end of at least one vertically aligned and axially displaced roller within said first or second roller series.

20 Claims, 11 Drawing Sheets

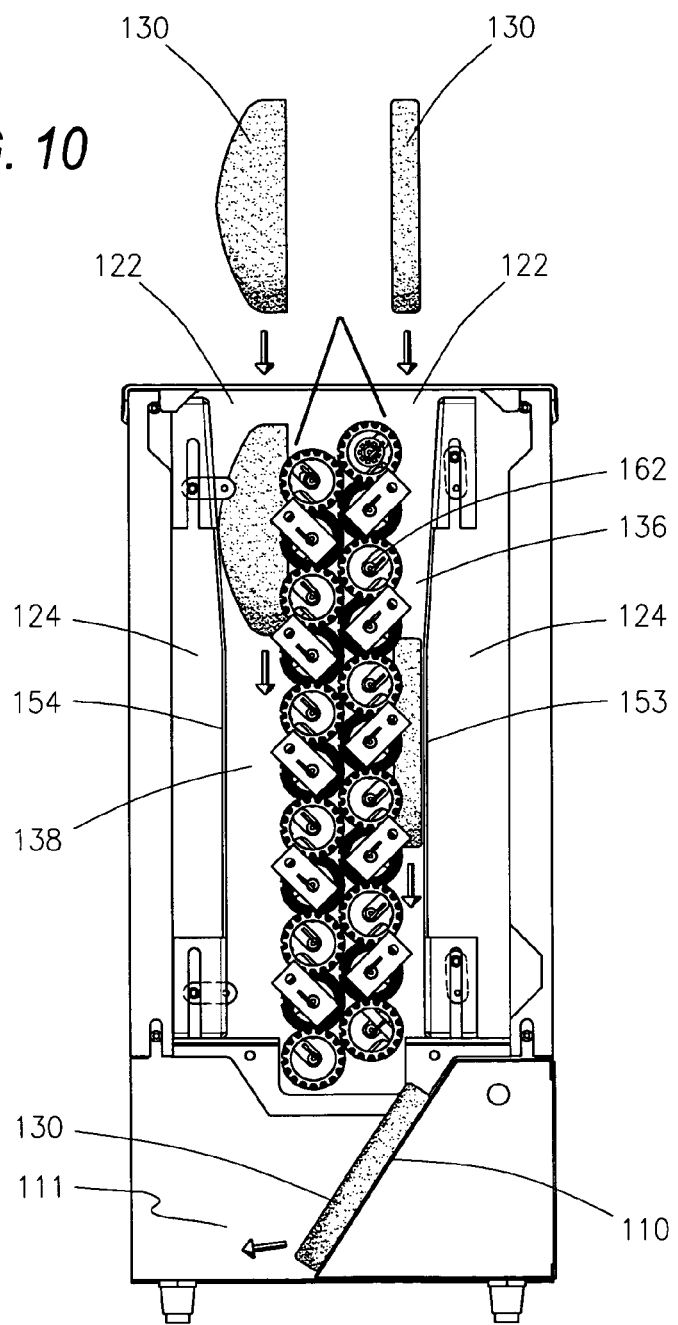

APPARATUS AND METHOD FOR A CHAIN MOTIVATED TOASTER WITH VERTICALLY ALIGNED ROLLERS

REFERENCE TO PENDING APPLICATIONS

This application is a continuation-in-part of currently pending U.S. patent application Ser. No. 10/851,024, filed May 21, 2004 which is hereby incorporated herein by reference in its entirety.

REFERENCE TO MICROFICHE APPENDIX

This application is not related to any microfiche appendix.

FIELD OF INVENTION

The present invention relates in general to toaster ovens and more specifically to an apparatus and method for a chain motivated toaster with centrally disposed, vertically aligned rollers.

BACKGROUND OF INVENTION

U.S. Pat. No. 4,261,257 purports to disclose and claim a "Toasting Apparatus". The invention discusses a toasting apparatus including a housing within which a heating platen is mounted having two opposed heating surfaces. Conveying means are positioned on each side of the heating platen with each conveying means spaced from a respective heating surface defining respective paths for travel of a bun half. Clearly distinguishable characteristics, particularly structural, may be had with respect to the benefits and teachings of the '257 patent and the instant invention. Most particularly and as will be discussed in association with the detail disclosure of the instant invention, the '257 patent lacks disclosure teaching or claim of a chain/gear driven conveyance means whereby a consumable item to be cooked or toasted as it traverses the internal portion of the toaster oven in a heating zone positioned between a backing plate and a series of vertically aligned, centrally disposed rollers. Further distinguishing characteristics clearly show the '257 patent to be absent any teaching disclosure or claim with respect to integrated heating elements contained within a plurality of vertically oriented and aligned rollers providing heat on a first side of a toasted article and an optional backing plate heat source on the opposite side of the food item.

U.S. Pat. No. 5,673,610 purports to disclose and claim an "Apparatus for Conveyorized Toasting of Breads and Like Food Items". The invention discusses an apparatus for conveyorized toasting of sandwich buns and like bread and food items simultaneously on opposite sides comprises a central heated platen with two bun transport conveyors traveling in spaced relation along opposite sides of the platen and with a pair of auxiliary heating elements disposed outwardly of the respective food transport runs of the conveyors in facing relation to the opposite sides of the platen. While the '610 patent purports to claim a simultaneous toasting of crown and heel portions of sandwich buns, bread and similar food items it is clear the '610 patent lacks the art enhancement teachings of the instant invention with respect to a plurality of centrally disposed, vertically aligned gear/chain driven rollers with integrated heating elements interspersed between said rollers and/or within the internal core portion of each roller. Further, the '610 patent would further seem to indicate a limitation with respect to the conveying means in that it lacks the resiliency and reliability of the chain driven mechanism of the instant invention and instead relies upon the contemporary teachings of the field of the art in which belt like conveyance means substantially subject to motivation failure are relied upon and utilized.

Consequently, given the deficiencies of the above noted art and other representative teachings, it is clear what is needed is a vertically oriented roller toaster oven with first and second heating zones disposed and positioned between one or more series of centrally disposed vertically aligned axially displaced rollers and respectfully positioned backing plates. The instant invention meets and exceeds this demand and further enhances the art by disclosing an alternatively positioned uppermost roller pair which may be angularly displaced from those immediately below to provide for ease of entrance with respect to a food item and one or more signaling means allowing for automatic adjustment of time required for food item(s) to traverse the internal portion of the invention. The invention further discloses teaches and claims the conveying means which is embodied as a continuously linked chain motivated by an electric motor and connected to a spur gear which is mountedly affixed to a vertical roller seating bracket and engagement gear located on an end of at least one of the vertically aligned and axially displaced rollers.

SUMMARY OF INVENTION

In view of the foregoing and other considerations, the present invention relates to an apparatus and method for a chain motivated toaster with vertically aligned rollers. It is intended for benefits teachings and claims of the present invention to disclose a roller toaster oven having a conveying means which includes a continuously linked chain motivated by an electric motor. The electric motor and chain are communicably attached in turn to a spur gear, sprocket, or other similarly purposed and operationally compatible structure mountedly affixed to a vertical roller seating collar and an engagement gear located on the ends of a plurality vertically aligned and axially displaced rollers.

It is a further benefit and teaching of the instant invention to provide a vertically oriented roller oven having a slightly offset upper-most roller pair to provide for ease of entrance with respect to a food product entering the internal portion of the roller oven.

It is yet another benefit and teaching of the roller-type oven of the present invention to provide an oven housing where an oven cavity is formed within the internal portion of the housing constituting internal heating portion(s) which are distinguishably separated by one or more series of vertically aligned roller series substantially centrally positioned and disposed within the cavity.

It is yet a further benefit and teaching of the instant invention to provide centrally disposed, vertically aligned rollers motivated by a chain and gear mechanism to grasp a food item to be toasted/cooked and facilitate the traversing of said food item in a descending manner through the heating portion(s) of the toaster oven.

Yet another benefit and teaching of the instant invention is to provide a vertically-oriented toaster oven with first and second heating zones disposed within the internal portion of the housing oven housing and positioned between a backing plate's heating surface and one or more central position roller series of vertically-aligned axially displaced rollers.

As is further contemplated, disclosed and claimed in association with the instant invention is another object to provide a methodology to be employed when practicing the instant invention in a preferred embodiment.

Accordingly, a vertically-oriented roller toaster oven for processing food products and a method of use is disclosed and provided that includes a vertically oriented roller oven for processing food. An oven housing forming an oven cavity, the oven housing having top, bottom, first, second, third and fourth side portions, one or more food product inlet openings, an internal heating portion distinguishably separated by first and second series of centrally disposed vertically aligned and axially displaced rollers and an exit opening each in communication with the oven cavity. First and second backing plates are respectfully positioned opposite each of said first and second series of centrally disposed vertically aligned and axially displaced rollers to frictionally engage and capture a food product, once introduced to said inlet opening(s) of the oven cavity. The frictional engagement causing the food product to descendingly traverse the internal portion of the oven cavity between said plurality of vertically aligned and axially displaced rollers and said respectfully positioned first and second backing plates. A conveying means including a continuously linked chain motivated by an electric motor connected to a sprocket mountably is affixed to a roller seating bracket and an engagement gear located on an end of at least one centrally disposed, vertically aligned and axially displaced roller within said first or second roller series. A first heating zone disposed within the oven cavity and positioned between said first backing plate and said first series of centrally disposed vertically aligned and axially displaced rollers. A second heating zone disposed within the oven cavity and positioned between said second backing plate and said second series of centrally disposed vertically aligned and axially displaced rollers. An exiting path is positioned below the lowermost more vertically aligned and axially displaced roller in each of said first and second heating zones and in communication with said exit opening.

The proceeding has outlined the features and technical advantages of the present invention in order that the detailed description of the invention that follows may be better understood. Additional features and advantages of the invention will be described hereinafter which forms the subject of the claims of the invention.

In this respect, before explaining at least one embodiment of the invention in detail, it is to be understood that the invention is not limited in this application to the details of construction and arrangement of the components set forth in the following description or illustrated in the drawings. As will be readily appreciated by those skilled in the are, the invention is capable of other embodiments and of being practiced and carried out in various ways. Also, it is to be understood that the phraseology and terminology employed herein are for the purpose of description and should not be construed as limiting. As such, those skilled in the art will appreciate that the conception, upon which this disclosure is based, may readily be utilized as a basis for the designing of other structures, methods and systems for carrying out the several purposes of the present invention. It is important therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially design engineers and practitioners in the art who are not familiar with patent or legal terms or phraseology, to determine quickly form a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF DRAWINGS

For a more complete understanding of the present invention, and the advantages thereof, reference is now made to the following descriptions taken in conjunction with the accompanying drawings, in which:

FIG. 10 is a representative view of an internal portion of the instant invention providing further detail with respect to the traversing of a food product through the internal portion of the invention.

DETAILED DESCRIPTION OF THE INVENTION

While making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

The claims and specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

Figure 1:
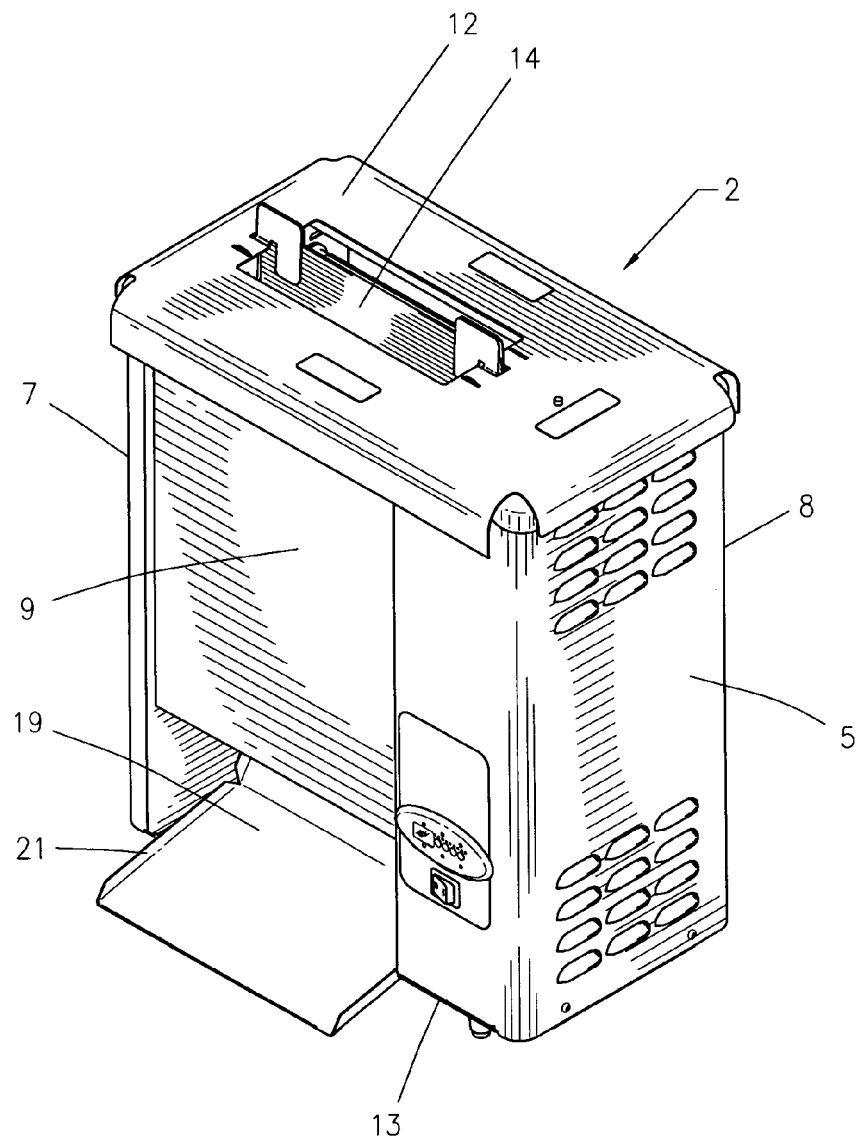
FIG. 1 is a representative view of an embodiment of the parent application intention's exterior.

Referring now to the drawings wherein depicted elements are not necessarily shown to scale and wherein like or similar elements in FIGS. 1 through 5 (parent invention), and FIGS. 6 through 10 (instant invention), are designated by the same reference numeral through the several views. Turning now to FIG. 1.

FIG. 1 is a representative view of an embodiment of the parent application invention's exterior. In FIG. 1 it is shown where an embodiment of the instant invention is generally referred to as 2. The invention comprises an oven housing having a top 12 bottom 13 side 5, 7, 8 and 9. Also shown in FIG. 1 is an inlet opening 14 through which food products such as but not limited to toast, buns, and similar consumables may be inserted and introduced to the internal portion of the toaster oven 2. As used throughout this application, the terms "internal portion," "heating portion" and "oven cavity" are used synonymously and interchangeably. Lastly, shown in FIG. 1 is an exiting surface 19 and opening 21 through which a food item exits the oven having traversed the oven's internal portion.

Figure 2:
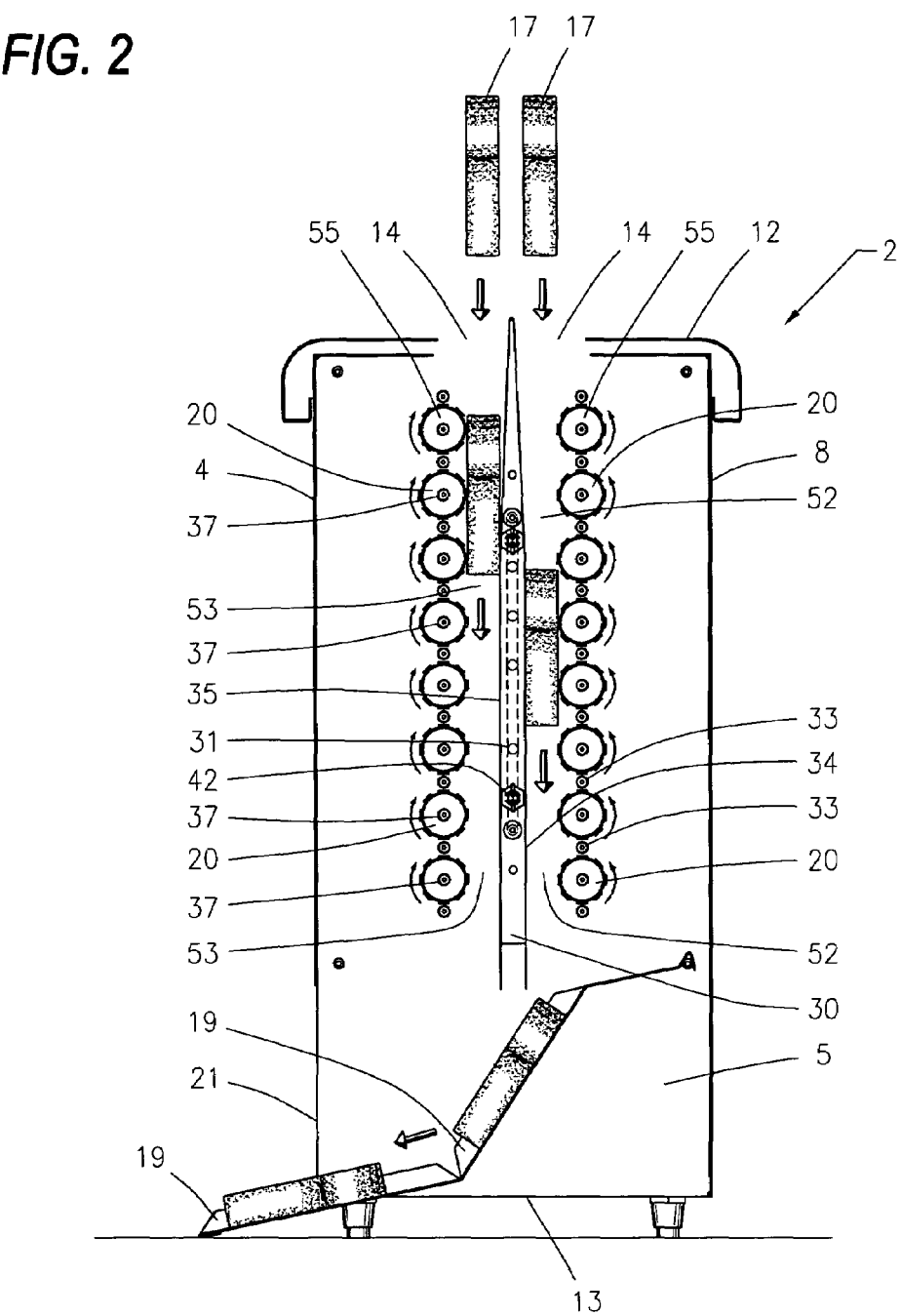
FIG. 2 is a representative view of an internal portion of the parent application invention providing further detail with respect to the traversing of a food product through the internal portion of the invention.

FIG. 2 illustrates a representative view of the internal portion of the parent application invention providing further detail with respect to the traversing of a food product through the invention's internal portion. In FIG. 2, it is shown where food item 17 enters the internal portion of the toaster oven 2 through inlet opening 14. Food item 17 having once traversed the inlet opening 14, is frictionally engaged by a plurality of vertically-aligned and axially displaced rollers 20. The uppermost pair of vertically aligned rollers 55, though not illustrated in FIG. 2, may be angularly displaced from the roller pair directly below. Such angular displacement allows for ease of entrance with respect to food items and will be further discussed in association with FIG. 3. The rollers 20 of the instant invention 2 have a coated, dimpled, or otherwise irregularly faced surface which allows food article 17 to be frictionally engaged and positioned between one or more rollers 20 and a substantially centrally positioned heating platen 30 disposed within the internal portions of the toaster 52, 53. The heating platen 30 typically though not necessarily, contains within its innermost portion a heating conduit 31. Food item 17 descendingly traverses the internal portion 52, 53 of oven 2 between rollers 20 and platen 30 until such time as the food item 17 exits the toaster via exiting ramp 19 and exit opening 21.

The rollers of the instant invention are typically, though not limitedly comprised of stainless steel or other similarly intended heat conducting material. Further shown in FIG. 2 are optional heating elements 37 which may positioned within the centermost portion of rollers 20. As a consequence of food item 17's traversing between rollers 20 and platen 30 and the coordinated establishment of a heating threshold for heating sections 52 and 53, the food items become cooked and/or toasted. A readily envisioned alternative embodiment would allow for auxiliary heating elements 33 to be interspersed between vertically-aligned rollers 20 to complement or supplant heating elements 37 which may or may not be present within the centermost portion of rollers 20.

Figure 3:
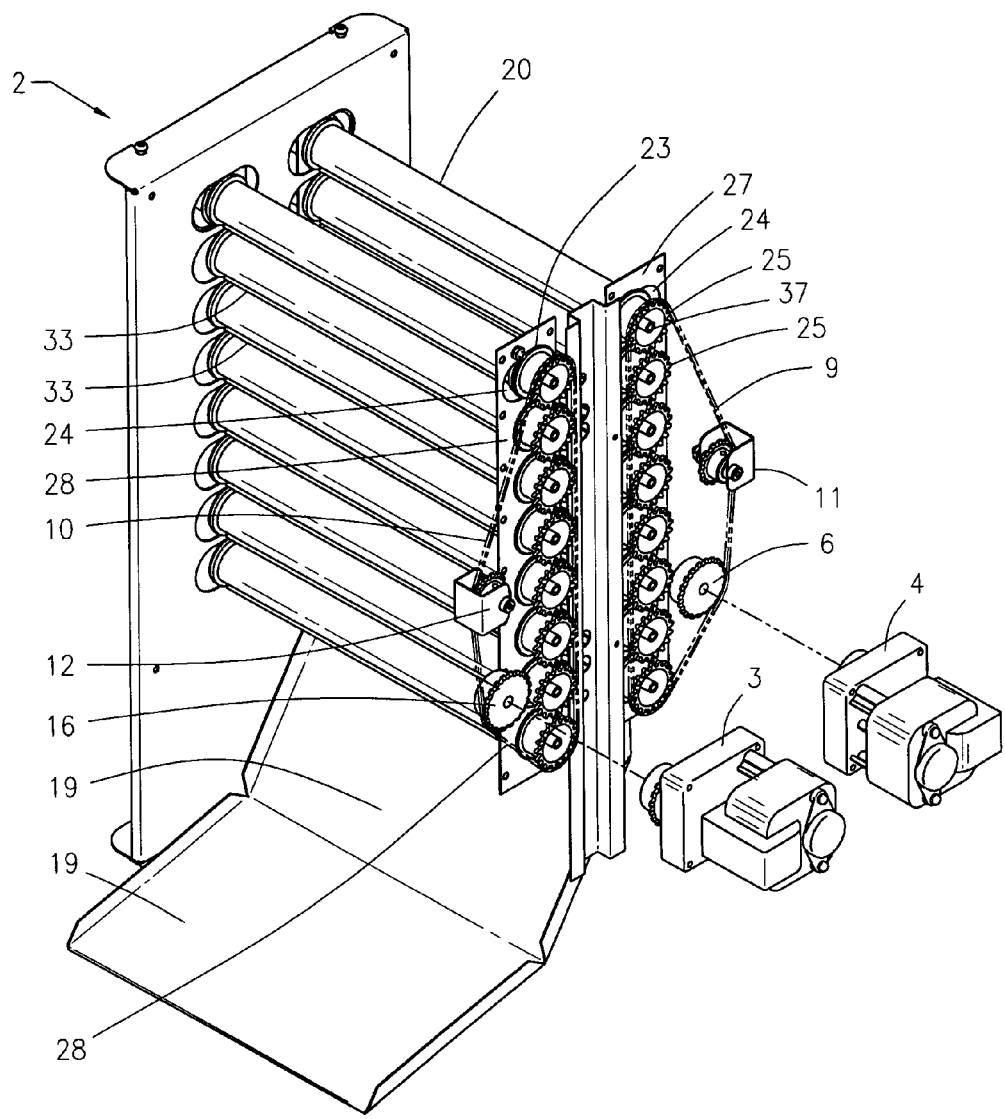
FIG. 3 is a representative view of an internal portion of the parent application invention providing further detail with respect to the invention's chain/motor conveyance means and representative, though not limiting, positioning thereof.
Figure 4:
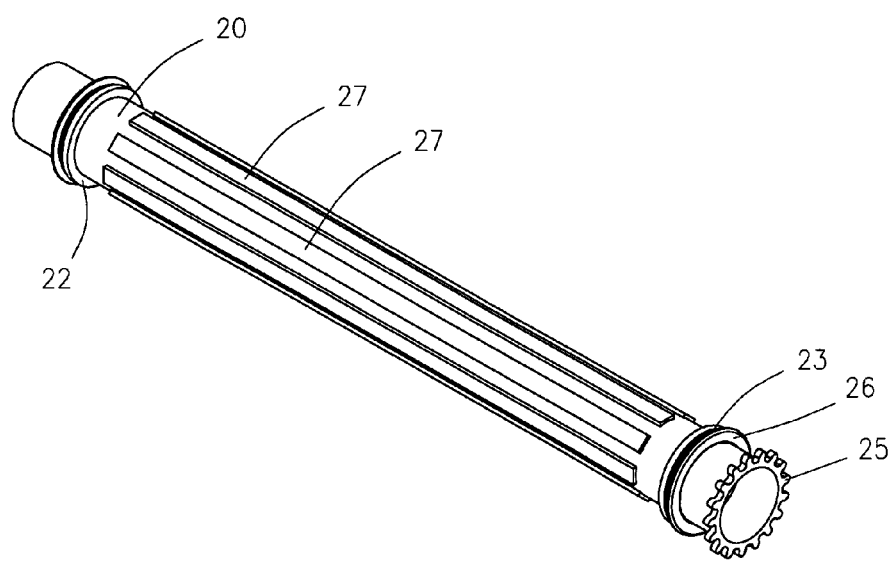
FIG. 4 is a representative view of a roller of the parent application invention providing further detail with respect to said roller bearing shoulders (a.k.a 'seating collar'), gear facing, and optional heating element shown as ∃7 inserted through the centermost portion of said roller.

FIG. 3 illustrates a representative view of the internal portion of the parent application invention providing further detail with respect to chain/motor conveyance means 3, and 4, 19 respectively. FIG. 3 an embodiment of the instant invention shows a continuously linked chain 10, 9 is shown motivated by one or more electric motors 3, 4 which, in turn, are connected to spur gears or sprockets 6 and 16 and optional idler gears 11 and 12. The continuously linked chain 10, 9 motivates rollers 20 via engagement of gear teeth 25 located on the outermost end portions of rollers 20. In FIG. 3, it is shown where rollers 20 are seated within mounting brackets 27, 28 to allow the motivated rotation of rollers 20. It is further shown in FIG. 3 where mounting bracket 28 possesses orifice 24 to axially seat the uppermost vertically aligned roller or roller pair (See 55 FIG. 1). This orifice structure 24 is again replicated in bracket 27 and correspondingly opposed brackets on the opposite ends of rollers 20 (not illustrated in FIG. 3). The orifice 24 allows for variable horizontal positioning of the uppermost roller pair. As such, the uppermost roller pair 55 may be angularly offset from the roller pair immediately below and thus, facilitate ease of entrance for a food product to be processed. Additional detail with respect to roller element structure will be illustrated and discussed in association with FIG. 4. Turning now to FIG. 4.

Figure 4A:
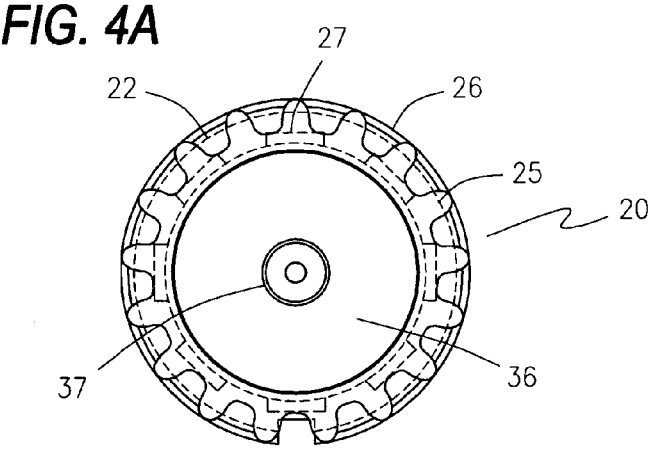
FIG. 4A is a representative view of an end-view of the roller of FIG. 4 and depicts the roller's gear teeth, center portion and end optional heating element.
Figure 5:
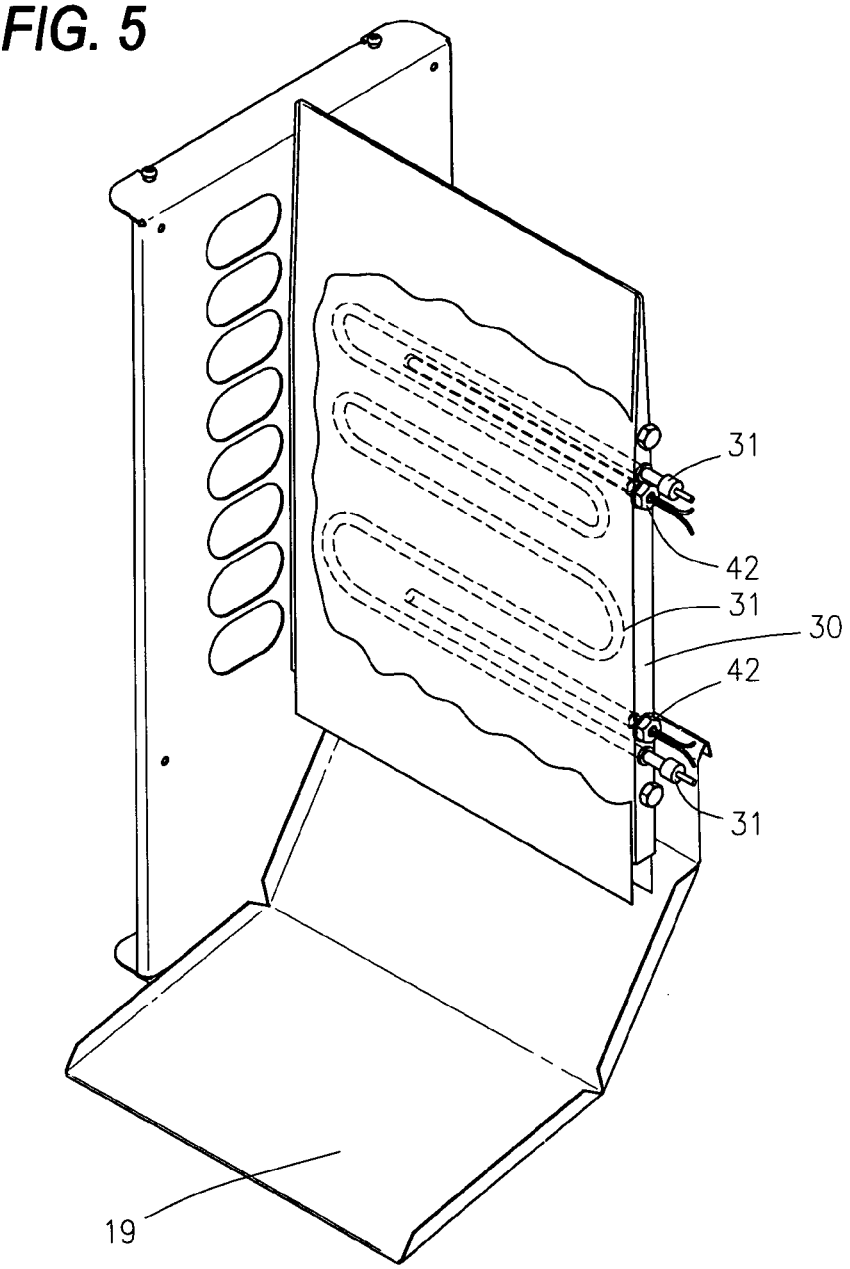
FIG. 5 is a representative view of an embodiment of the parent application invention providing further detail with respect to the invention's platen and said platen's associated heating means.

In FIG. 4, it is shown where seat 23 of roller 20 is defined as a recessed area existing between flange (bearing shoulders) members 22 and 26. Element 27 is intended to represent a raised facing of roller 20 which is used to frictionally engage a food item when inserted between said roller 20 and platen 30 as discussed in association with FIG. 2. FIG. 4A provides an end-view illustration of roller 20 showing further detail with respect to roller 20's gear teeth, 25 center portion, 36 and end optional heating element 37. Turning now to FIG. 5.

FIG. 5 illustrates a representative view of an embodiment of the parent application invention providing further detail with respect to the invention's platen 30 and associated heating means 31. It is shown where the platen 30 of the instant invention contains a serpentined or similarly intended heating element 40. In FIG. 5a thermal transducer such as, but not limited to thermocouples, thermisters, bulb and capillary sensors, etc., 42 are contemplated by the instant invention and allow the temperature of heating element 31 to be utilized to signal heater 31 and/or motors 3 and 4. Such coordinated signaling is well known to those in the art and may be employed in the present invention to responsively accelerate or reduce transmit time of a food article through heating zones (REF 52 and 53-FIG. 2). It is further contemplated, disclosed and claimed that one or more heating elements may be interspersed between horizontally-aligned rollers 33 or contained within the center portion 36 of said vertically aligned rollers 20 to facilitate a similar increase or decrease in transmit time of said food article. Such signaling and food processing time may be had with independent signals from each of said heating elements, or in any combination thereof according to temperature sensing and variable speed motor signaling well known to those skilled in the art.

Figure 6:
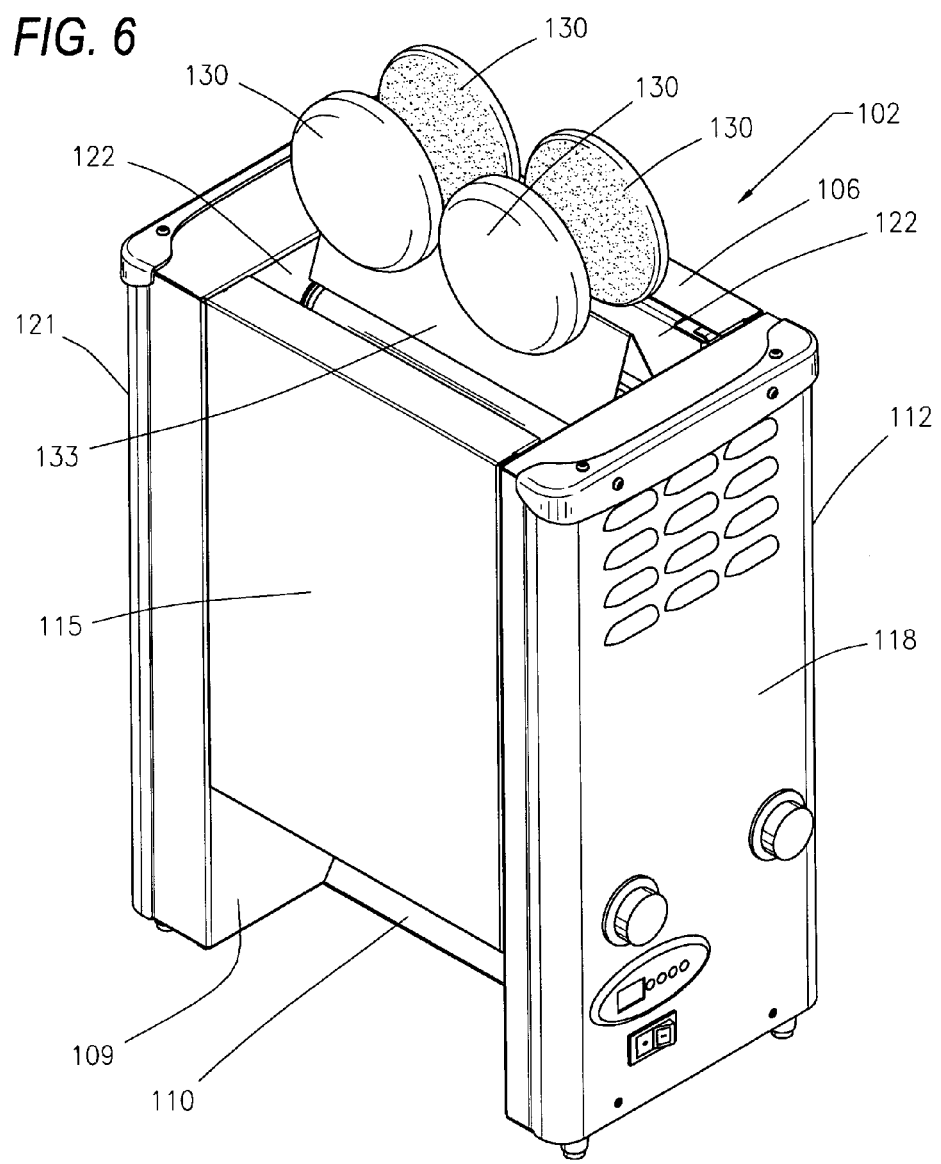
FIG. 6 is a representative view of an embodiment of the instant invention's exterior presentation.
Figure 7:
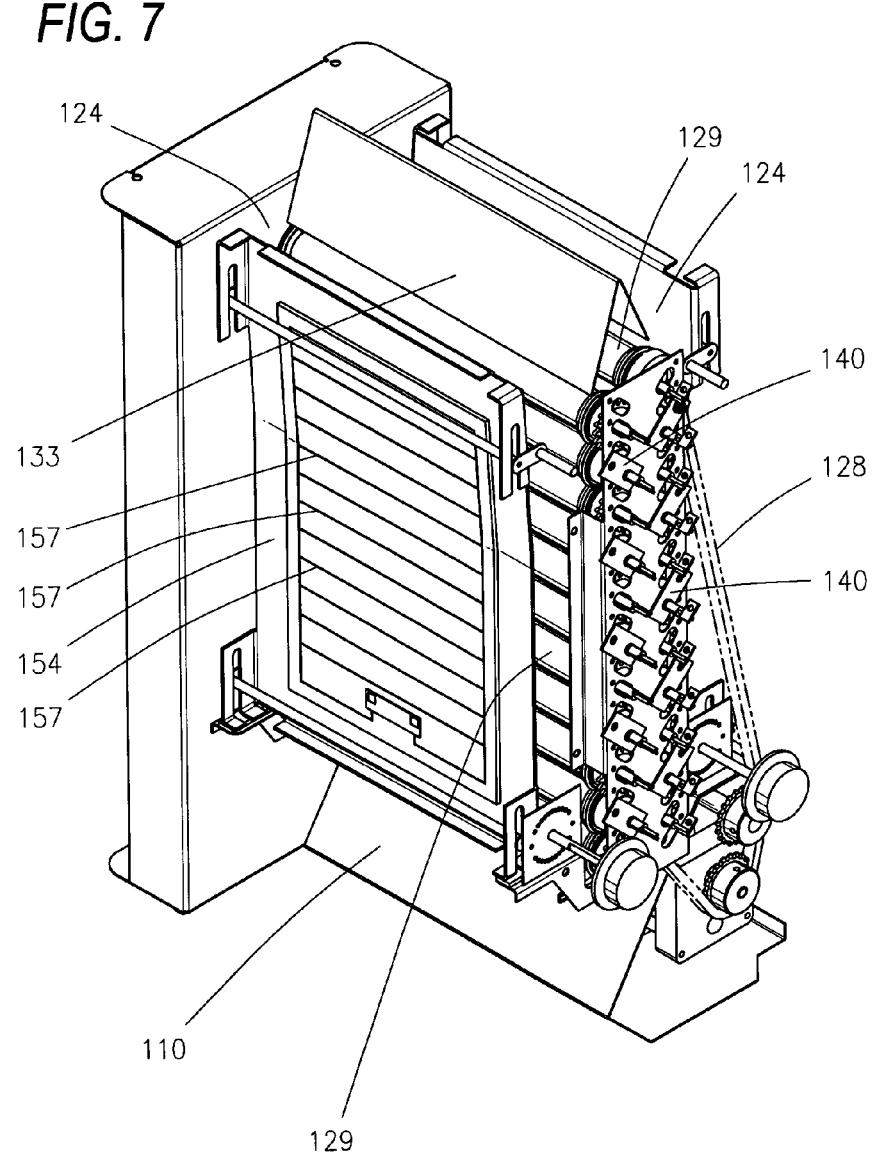
FIG. 7 is a representative view of an internal portion of the instant invention of an embodiment of the instant invention providing further detail with respect to the invention's chain/motor conveyance means, representative though not limiting positioning of the centrally disposed roller series and respectfully positioned backing plates associated therewith.

FIGS. 6-10 illustrate a vertically-oriented roller toaster oven where an embodiment of the instant invention is generally referred to as 102. As illustrated in the exterior presentation depicted in FIG. 6, it can be observed where the vertically-oriented roller oven 102 for processing food comprises an oven housing with the oven housing having a top 106, bottom 109, first 112, second 115, third 118 and fourth 121 portions. The roller toaster oven 102 is further disclosed in FIG. 6 illustrating one or more product inlet openings 122 and an internal heating portion (not illustrated FIG. 6) which is distinguishably separated by a first and second series of centrally disposed, vertically aligned and axially displaced rollers (not disclosed FIG. 6, disclosed in detail and association with FIGS. 7-10). Splitter plate 133 is shown mountably positioned within or between inlet openings 122 as is a food product 130 (depicted in FIG. 1 as an English muffin/split bun food article). The exterior view presentation of FIG. 6 lastly discloses a dispersion plate 110 in communication with the oven cavity 124. (Ref. FIG. 10).

With continuing reference to FIGS. 6-10, it may be further observed where the internal portion of the vertically oriented roller oven 102 further comprises first 153 and second 154 backing plates which are respectfully positioned opposite of first 151 and second 152 series of centrally disposed, vertically aligned, axially displaced rollers which are positioned to frictionally engage and capture a food product 130 once the food product 130 is introduced to inlet openings 122 and oven cavity 124. The frictional engagement of food product 130 causes it to descendingly traverse the internal portion of the oven cavity 124 between either or both set(s) of vertically aligned and axially displaced roller series 151 and 152 and a correspondingly/respectfully positioned first 153 and second backing plate 154. It is hereby noted and has been disclosed in the parent application, that the vertically aligned rollers of the instant invention further comprise a textured surface which is so designed to enhance the frictional engagement capability of said rollers.

A first heating zone 136 is shown disposed within the oven cavity 124 and is positioned between said first backing plate 153 and said first series of centrally disposed, vertically aligned and axially displaced rollers 151. A second heating zone 138 is also contemplated in the figures and is shown as disposed within the oven cavity 124 positioned between said second backing plate 154 and said second series of centrally disposed, vertically aligned and axially displaced rollers 152. A dispersion plate 110 for food product 130 is shown positioned below said first and second heating zones and is in communication with exit opening 111. As used herein, the term "exiting path" and "dispersion plate" are intended to refer to a guidance means by which a food product having once traversed either of said first 136 and second heating zones 138 may be guidingly exited from the cavity portion 124 of said roller toaster oven.

Figure 8A:
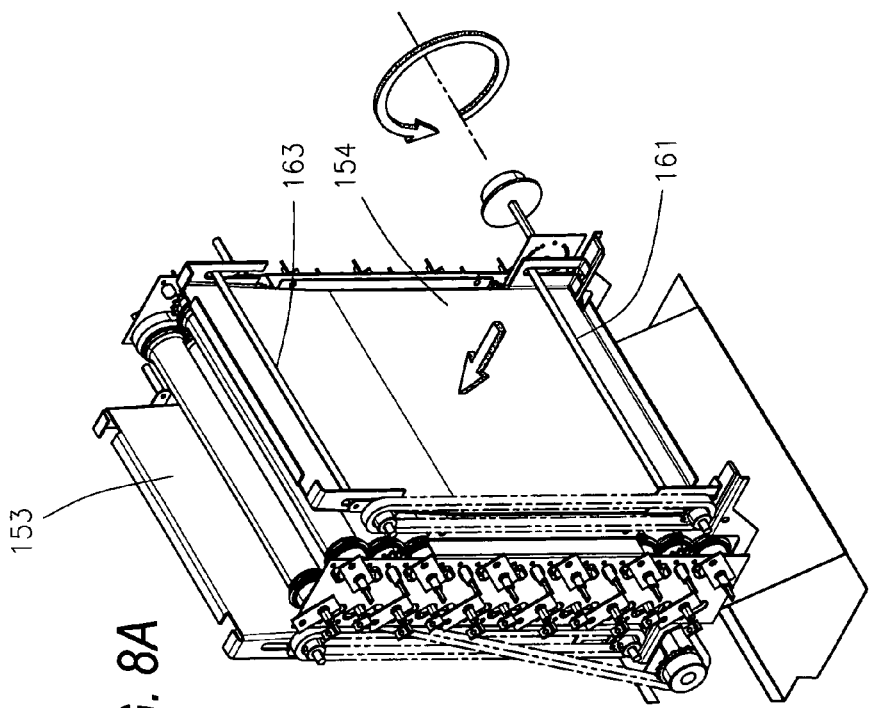
FIGS. 8 through 8D are representative views of an internal portion of the instant invention providing further detail with respect to an adjustable means by which one or more of the invention's backing plates may be distanced incrementally from/to the invention's centrally disposed vertically aligned roller sets and gearing and motor/idler gear positioning with respect to the invention's chain-driven motivation means.
Figure 8:
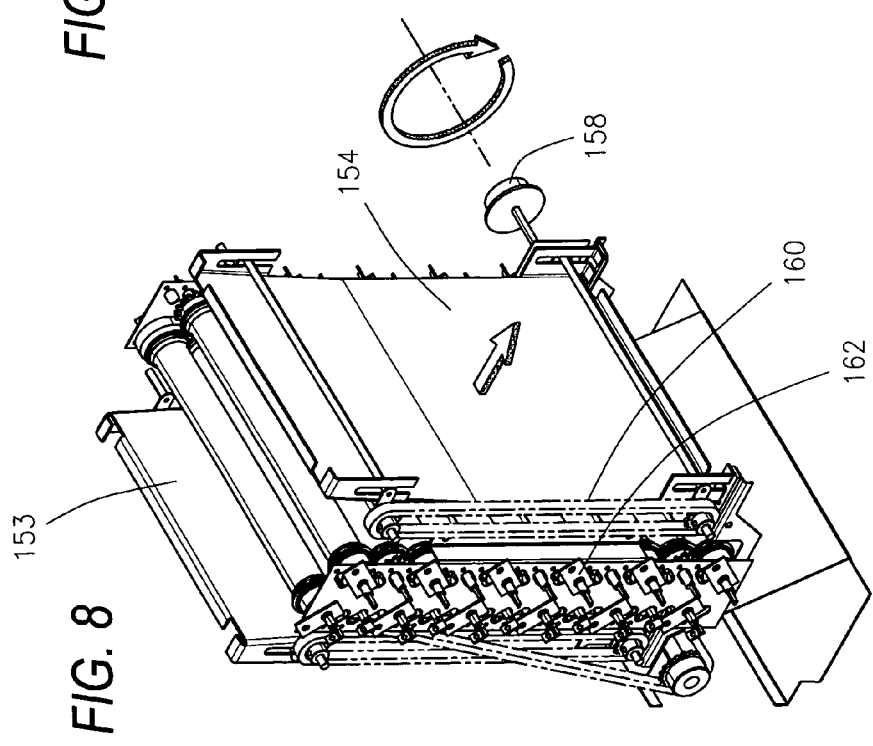
Figure 8C:
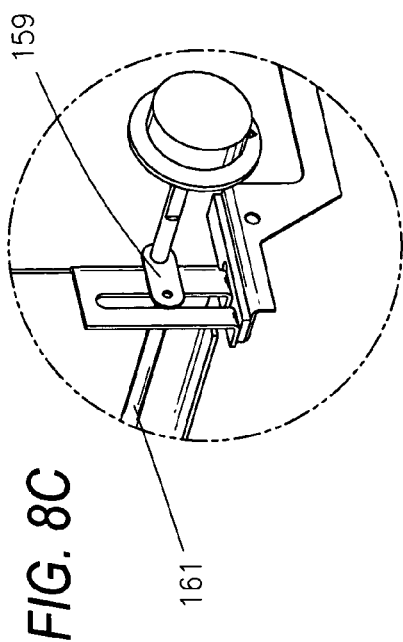
Figure 8D:
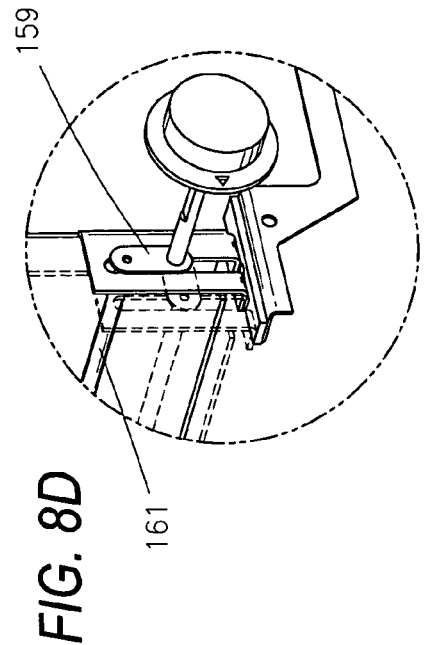
Figure 8B:
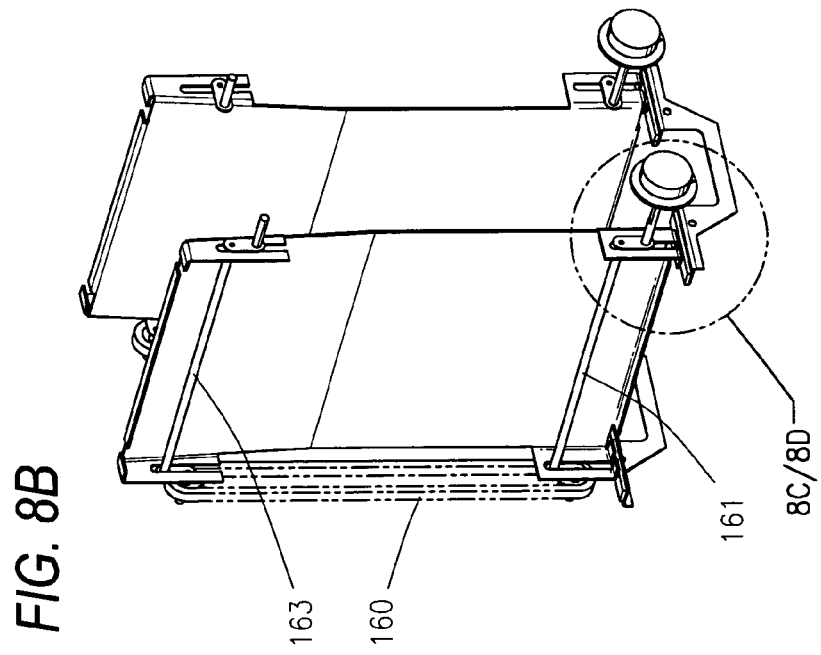
Figure 9:
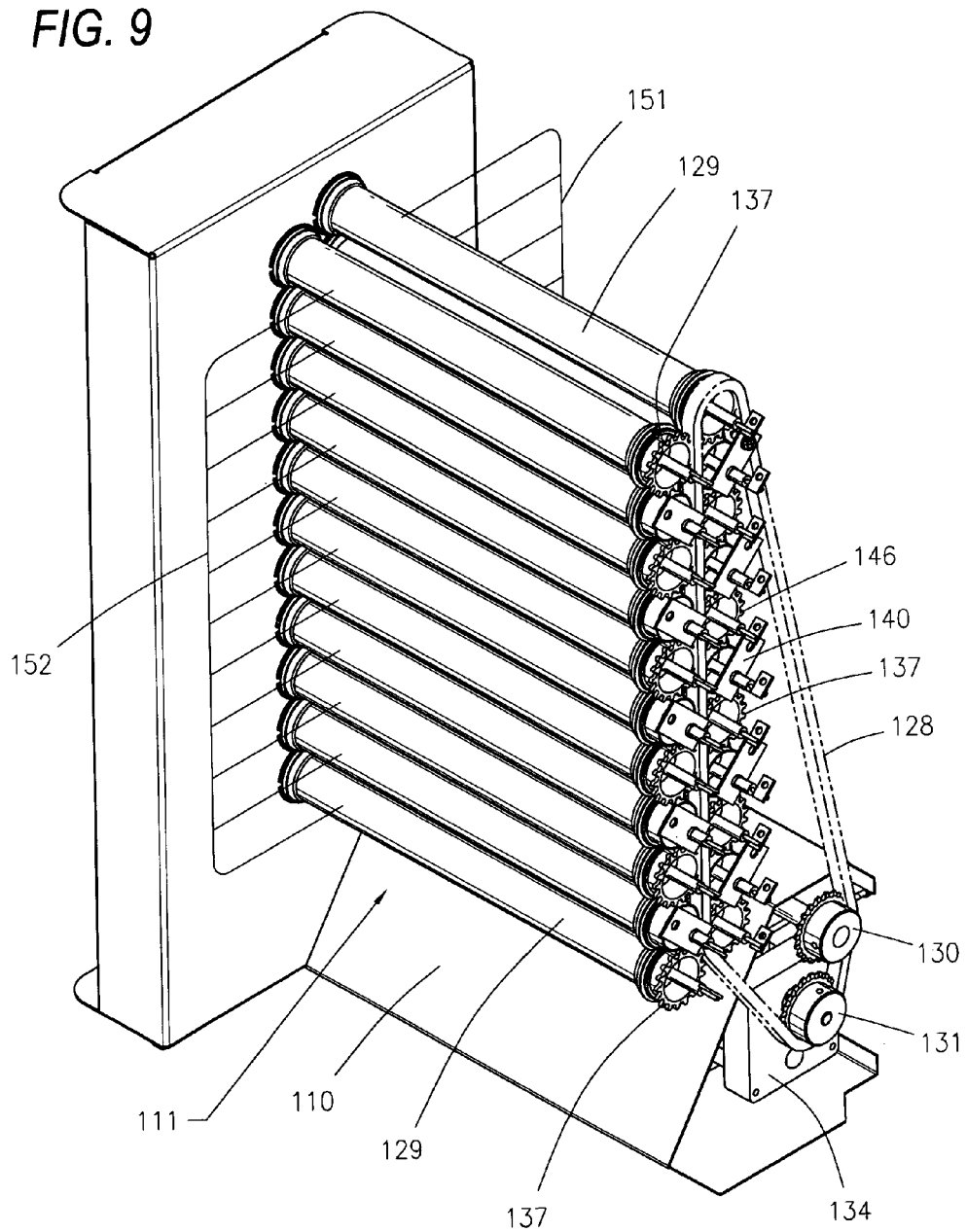
FIG. 9 is a representative view of an internal portion of the instant invention of an embodiment of the instant invention providing further detail with respect to the invention's chain/motor conveyance means and representative though not limiting positioning of the centrally disposed roller series associated therewith.

With particular reference to FIGS. 8 through 8D it may be noted wherein the roller toaster oven 102 provides a means by which either first 153 or second backing plates 154 may be incrementally adjusted to minimize or distance itself from its correspondingly aligned roller series (151, 152). In FIGS. 8 through 8D it may be observed where roller adjustment 158 is used to dispose lever 159 to either of one or two positions. Reference 159 8D, 8E. In so doing, lever 159, connected to an adjustment bar 161 motivates or otherwise distances first heating plate 153 or second heating plate 154 from its respectively aligned roller series (151, 152). A connection guide 160 attached to an upper adjustment bar 163 ensures that both top and bottom portions of said heating plates 153, 154 are transitioned equal distances to/from their respectively aligned roller series.

To enhance the art, disclosure and teachings of the parent application, it is to be noted that the upper-most, horizontally opposed roller pair in each of either roller series (151, 152) may be angularly offset from the roller pair immediately below to allow ease of entrance with respect to food product 130 through inlet 122. Also in keeping with disclosure and teachings of the parent application, and intended to enhance the art disclosed therein, one or more rollers 129 in each of said first 151 and second 152 series of said rollers may contain an integrated heating element 140 such as but not limited to those heating elements known and practiced in the field and referred to as Cal-Rod style heating elements. It is further contemplated that the disclosure and claims of the instant invention includes the capability by which either or both first 153 or second backing plate 154 may further comprise heating elements 157, thereby providing great versatility with respect to the introduction of heat to the internal cavity or heating portion of the roller toaster oven either by roller exclusively, roller and backing plate or backing plate only heat introduction means. By addressing this versatility in application design, it is intended that such disclosure will encompass all possible combinations of roller and backing plate heat introduction to a heating portion of a roller toaster oven to influence or otherwise precipitate the toasting/cooking of a food product having once been introduced traversed therethrough.

In the preferred embodiment of the instant invention it will be observed where the vertically oriented roller toaster oven for processing food 102 comprises a vertically oriented roller oven for processing food. An oven housing forming an oven cavity 124, the oven housing having top 106, bottom 109, first 112, second 115, third 118 and fourth 121 side portions, one or more food product inlet openings 122, an internal heating portion distinguishably separated by first 151 and second 152 series of centrally disposed vertically aligned and axially displaced rollers and an exit opening 110 each in communication with the oven cavity 124. First 153 and second 154 backing plates respectfully positioned opposite each of said first 151 and second 152 series of centrally disposed vertically aligned and axially displaced rollers. Each of said plates (153, 154) comprises an adjustment means (158, 159, 160, 161, 163) by which the distance between each of said plates (153, 154) and said respectfully positioned roller series (151, 152) may be adjusted incrementally to frictionally engage and capture a food product 130 once introduced to said inlet opening(s) of the oven cavity, said frictional engagement causing the food product 130 to descendingly traverse the internal portion of the oven cavity between said plurality of vertically aligned and axially displaced rollers and said respectfully positioned first 153 and second 154 backing plates.

A conveying means including a continuously linked chain 128 motivated by an electric motor (not shown) connected to a sprocket gear 131 mountably affixed to a roller seating bracket and an engagement gear 137 located on an end of at least one vertically aligned and axially displaced roller 129 within said first 151 or second 152 roller series. A first heating zone 136 is disposed within the oven cavity 124 and is positioned between said first backing plate 153 and said first series 151 of centrally disposed vertically aligned and axially displaced rollers. A second heating zone 138 is disposed within the oven cavity 124 and is positioned between said second backing plate 154 and said second 152 series of centrally disposed vertically aligned and axially displaced rollers. A dispersion plate 110 positioned below the lowermost more vertically aligned and axially displaced roller in each of said first 136 and second heating 138 zones and in communication with exit opening 111. A first temperature control system is contemplated and connected to a first backing plate 153 and one or more vertically aligned and axially displaced rollers within said apparatus's first heating zone 136 in a manner to monitor and selectively control the temperature of said first heating zone 136 separately from that of said second heating zone 138. A second temperature control system is also contemplated and connected to second backing plate 154 and one or more vertically aligned and axially displaced rollers within said apparatus's second heating zone 138 in a manner to monitor and selectively control the temperature of said second heating zone separately from that of said first 136 heating zone.

The practice of the instant invention is facilitated by a method for processing food products which comprises the steps of providing a vertically oriented roller toaster oven 102 having an oven housing forming an oven cavity 124, the oven housing having top 106, bottom 109, first 112, second 115, third 118 and fourth 121 side portions, one or more food product inlet openings 122, an internal heating portion distinguishably separated by first 151 and second 152 series of centrally disposed vertically aligned and axially displaced rollers and an exit opening each in communication with the oven cavity 124; first 153 and second 154 backing plates respectfully positioned opposite each of said first 153 and second 154 series of centrally disposed vertically aligned and axially displaced rollers to frictionally engage and capture a food product 130 once introduced to said inlet opening(s) 122 of the oven cavity 124, said frictional engagement causing the food product 130 to descendingly traverse the internal portion of the oven cavity between said first and second series of centrally disposed, vertically aligned and axially displaced roller series (151, 152) and said respectfully positioned first 153 and second backing plates 154, a conveying means including a continuously linked chain 128 motivated by an electric motor connected to a sprocket gear 131 mountably affixed to a roller seating bracket and an engagement gear 137 located on an end of at least one vertically aligned and axially displaced roller 129 within said first 151 or second 152 roller series; a first heating zone 136 disposed within the oven cavity 124 and positioned between said first backing plate 153 and said first series of centrally disposed vertically aligned and axially displaced rollers 151; a second heating zone 138 disposed within the oven cavity 124 and positioned between said second backing plate 154 and said second series 152 of centrally disposed vertically aligned and axially displaced rollers 129; and an exiting path positioned below the lowermost more vertically aligned and axially displaced roller in each of said first and second heating zones and in communication with said exit opening. Introducing a food product to said first 136 and second heating zone 138. Transporting a food product through the interior portion of said vertically oriented roller oven and exiting said food product from the internal portion of said toaster.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed is:

1. A vertically oriented roller oven for processing food comprising:

an oven housing forming an oven cavity, the oven housing having top, bottom, first, second, third and fourth side portions, one or more food product inlet openings, an internal heating portion distinguishably separated by first and second series of centrally disposed vertically aligned and axially displaced rollers and an exit opening each in communication with the oven cavity;

first and second backing plates respectively positioned opposite each of the first and second series of centrally disposed vertically aligned and axially displaced rollers to frictionally engage and capture a food product once introduced to the inlet opening(s) of the oven cavity, the frictional engagement causing the food product to descendingly traverse the internal portion of the oven cavity between the plurality of vertically aligned and axially displaced rollers and the respectively positioned first and second backing plates;

a conveying means including a continuously linked chain motivated by an electric motor connected to a sprocket mountably affixed to a roller seating bracket and an engagement gear located on an end of at least one vertically aligned and axially displaced roller within the first or second roller series;

a first heating zone disposed within the oven cavity and positioned between the first backing plate and the first series of centrally disposed vertically aligned and axially displaced rollers;

a second heating zone disposed within the oven cavity and positioned between the second backing plate and the second series of centrally disposed vertically aligned and axially displaced rollers;

an exiting path positioned below the first and second heating zones and in communication with the exit opening.

2. The apparatus of claim 1 further comprising a splitter plate mountably positioned within the inlet opening.

3. The apparatus of claim 1 wherein one or more of the backing plates is a heated backing plate.

4. The apparatus of claim 1 wherein one or more of the backing plates further comprises an adjustment means by which the distance between the backing plate and a respectfully positioned roller series may be incrementally adjusted.

5. The apparatus of claim 1 wherein the uppermost roller in each of the first and second series of rollers are angularly offset from the roller positioned immediately below.

6. The apparatus of claim 1 further comprising a first temperature control system connected to a first backing plate and one or more vertically aligned and axially displaced rollers within the apparatus's first heating zone in a manner to monitor and selectively control the temperature of the first heating zone independently of the second heating zone.

7. The apparatus of claim 1 further comprising a second temperature control system connected to a second backing plate and one or more vertically aligned and axially displaced rollers within the apparatus's second heating zone in a manner to monitor and selectively control the temperature of the second heating zone independently of the first heating zone.

8. The apparatus of claim 6 wherein the first temperature control system further comprises a means to dynamically increase or reduce time required for a food product to descendingly traverse the first heating zone in response to a temperature threshold established for the zone.

9. The apparatus of claim 7 wherein the second temperature control system further comprises a means to dynamically increase or reduce time required for a food product to descendingly traverse the second heating zone in response to a temperature threshold established for the zone.

10. The apparatus of claim 1 wherein at least one roller in each of the first and second series of rollers further comprises an integrated heating element.

11. A vertically oriented roller oven for processing food comprising:
   an oven housing forming an oven cavity, the oven housing having top, bottom, first, second, third and fourth side portions, one or more food product inlet openings, an internal heating portion distinguishably separated by first and second series of centrally disposed vertically aligned and axially displaced rollers and an exit opening each in communication with the oven cavity;
   first and second backing plates respectively positioned opposite each of the first and second series of centrally disposed vertically aligned and axially displaced rollers wherein each of the plates comprises an adjustment means by which the distance between each of the plates and the respectfully positioned roller series may be adjusted incrementally to frictionally engage and capture a food product once introduced to the inlet opening(s) of the oven cavity, the frictional engagement causing the food product to descendingly traverse the internal portion of the oven cavity between the plurality of vertically aligned and axially displaced rollers and the respectively positioned first and second backing plates;
   a conveying means including a continuously linked chain motivated by an electric motor connected to a sprocket mountably affixed to a roller seating bracket and an engagement gear located on an end of at least one vertically aligned and axially displaced roller within the first or second roller series;
   a first heating zone disposed within the oven cavity and positioned between the first backing plate and the first series of centrally disposed vertically aligned and axially displaced rollers;
   a second heating zone disposed within the oven cavity and positioned between the second backing plate and the second series of centrally disposed vertically aligned and axially displaced rollers;
   an exiting path positioned below the lowermost more vertically aligned and axially displaced roller in each of the first and second heating zones and in communication with the exit opening;
   a first temperature control system connected to a first backing plate and one or more vertically aligned and axially displaced rollers within the apparatus's first heating zone in a manner to monitor and selectively control the temperature of the first heating zone separately from that of the second heating zone; and
   a second temperature control system connected to a second backing plate and one or more vertically aligned and axially displaced rollers within the apparatus's second heating zone in a manner to monitor and selectively control the temperature of the second heating zone separately from that of the first heating zone.

12. The apparatus of claim 11 further comprising a splitter plate mountably positioned within the inlet opening.

13. The apparatus of claim 11 wherein one or more of the backing plates is a heated backing plate.

14. The apparatus of claim 11 wherein the uppermost roller in each of the first and second series of rollers are angularly offset from the roller positioned immediately below.

15. The apparatus of claim 11 wherein the first temperature control system further comprises a means to dynamically increase or reduce time required for a food product to descendingly traverse the first heating zone in response to a temperature threshold established for the zone.

16. The apparatus of claim 11 wherein the second temperature control system further comprises a means to dynamically increase or reduce time required for a food product to descendingly traverse the second heating zone in response to a temperature threshold established for the zone.

17. The apparatus of claim 11 wherein at least one roller in each of the first and second series of rollers further comprises an integrated heating element.

18. A method for processing food products comprising the steps of:
   providing a vertically oriented roller oven comprising:
      an oven housing forming an oven cavity, the oven housing having top, bottom, first, second, third and fourth side portions, one or more food product inlet openings, an internal heating portion distinguishably separated by first and second series of centrally disposed vertically aligned and axially displaced rollers and an exit opening each in communication with the oven cavity;
      first and second backing plates respectively positioned opposite each of the first and second series of centrally disposed vertically aligned and axially displaced rollers to frictionally engage and capture a food product once introduced to the inlet opening(s) of the oven cavity, the frictional engagement causing the food product to descendingly traverse the internal portion of the oven cavity between the first and second series of centrally disposed, vertically aligned and axially displaced rollers and the respectively positioned first and second backing plates;
      a conveying means including a continuously linked chain motivated by an electric motor connected to a sprocket mountably affixed to a roller seating bracket and an engagement gear located on an end of at least one vertically aligned and axially displaced roller within the first or second roller series;
      a first heating zone disposed within the oven cavity and positioned between the first backing plate and the first series of centrally disposed vertically aligned and axially displaced rollers;
      a second heating zone disposed within the oven cavity and positioned between the second backing plate and the second series of centrally disposed vertically aligned and axially displaced rollers;
      an exiting path positioned below the lowermost more vertically aligned and axially displaced roller in each of the first and second heating zones and in communication with the exit opening;
   introducing a food product to the first and second heating zone;
   transporting a food product through the interior portion of the vertically oriented roller oven; and
   exiting the food product from the internal portion of the toaster.

19. The method of claim 18 wherein the food product is introduced to the first heating zone exclusively.

20. The method of claim 18 wherein the food product is introduced to the second heating zone exclusively.

* * * * *